United States Patent
McElvain et al.

(10) Patent No.: US 11,106,664 B2
(45) Date of Patent: Aug. 31, 2021

(54) SYSTEMS AND METHODS FOR GENERATING A CONTEXTUALLY AND CONVERSATIONALLY CORRECT RESPONSE TO A QUERY

(71) Applicant: Thomson Reuters Enterprise Centre GmbH, Zug (CH)

(72) Inventors: Gayle McElvain, Arlington, VA (US); Tonya Custis, Minneapolis, MN (US); Matthew A. Surprenant, St. Paul, MN (US); Erik Lindberg, Minneapolis, MN (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 201 days.

(21) Appl. No.: 16/402,100

(22) Filed: May 2, 2019

(65) Prior Publication Data

US 2019/0340172 A1    Nov. 7, 2019

Related U.S. Application Data

(60) Provisional application No. 62/666,281, filed on May 3, 2018.

(51) Int. Cl.
*G06F 16/242*  (2019.01)
*G06N 5/04*    (2006.01)
*G06F 16/248*  (2019.01)

(52) U.S. Cl.
CPC ......... *G06F 16/243* (2019.01); *G06F 16/248* (2019.01); *G06N 5/046* (2013.01)

(58) Field of Classification Search
CPC ...... G06F 16/243; G06F 16/248; G06N 5/046
USPC ....................................................... 707/728
See application file for complete search history.

(56) References Cited

U.S. PATENT DOCUMENTS

| | | | |
|---|---|---|---|
| 2007/0260472 A1 | 11/2007 | Bennett et al. | |
| 2010/0030749 A1 | 2/2010 | Dahn | |
| 2011/0125734 A1* | 5/2011 | Duboue | G09B 7/00 707/723 |

(Continued)

OTHER PUBLICATIONS

International Search Report and Written Opinion issued for PCT Application No. PCT/IB2019/053658, dated Sep. 18, 2019, 10 pages.

*Primary Examiner* — Evan Aspinwall
(74) *Attorney, Agent, or Firm* — Norton Rose Fulbright US LLP

(57) ABSTRACT

The present disclosure relates to systems and methods for generating contextually, grammatically, and conversationally correct answers to input questions. Embodiments provide for linguistic and syntactic structure analysis of a submitted question in order to determine whether the submitted question may be answered by at least one headnote. The question is then further analyzed to determine more details about the intent and context of the question. A federated search process, based on the linguistic and syntactic structure analysis, and the additional analysis of the question is used to identify candidate question-answer pairs from a corpus of previously created headnotes. Machine learning models are used to analyze the candidate question-answer pairs, additional rules are applied to rank the candidate answers, and dynamic thresholds are applied to identify the best potential answers to provide to a user as a response to the submitted question.

19 Claims, 7 Drawing Sheets

(56) References Cited

U.S. PATENT DOCUMENTS

| | | | |
|---|---|---|---|
| 2011/0153601 A1 | 6/2011 | Nakazawa et al. | |
| 2017/0177715 A1* | 6/2017 | Chang | G06F 40/186 |
| 2017/0364806 A1 | 12/2017 | Boyer | |
| 2019/0213498 A1* | 7/2019 | Adjaoute | G06N 20/00 |

* cited by examiner

```
"query": {
  "bool": {
    "must": [
      {
        "match": {
          "sentenceText": "CLAIM_REMEDY"
        }
      }
    ],
    "should": [
      {
        "match": {
          "sentenceText": "FULL_QUESTION_TEXT"
        }
      },
      {
        "frame_query": {
          "frame": "burdenOfProof"
        }
      },
      {
        "match": {
          "sentenceText": "PARTY_ENTITY"
        }
      },
      {
        "match": {
          "sentenceText": "CLAIM_REMEDY"
        }
      },
      {
        "regexp": {
          "sentenceText":
          "(convincing|doubt|reasonable|preponderance|credible|substantial|evide
nce)"
        }
      }
    ]
  }
}
```

FIG. 4A

```
{
  "headNoteClassification": [
    {
      "id": 1,
      "label": "ABSTRACT",
      "tense": "PRESENT",
      "verb": "is"
    }
  ],
  "keyNumbers": [
    {
      "catchline": "CONTRACTS/Actions for Breach/Evidence/Weight and Sufficiency/In general",
      "formattedKeyNumber": "95+350(1)",
      "generic": "95",
      "specific": "350(1)"
    }
  ],
  "processSemanticVersion": "1.3.1-RELEASE",
  "sentenceText": "In action for breach of contract, burden of proof is on plaintiff to establish by preponderance the elements essential to recovery.",
  "wordcount": 21,
  "wordphrase": 1,
  "frame_query": [
    {
      "frame": "burden_of_proof",
      "score": 1
    }
  ],
  "jurisdiction": "LA-CS"
}
```

FIG. 4B

SYSTEMS AND METHODS FOR GENERATING A CONTEXTUALLY AND CONVERSATIONALLY CORRECT RESPONSE TO A QUERY

CROSS-REFERENCE TO RELATED APPLICATION

The present application claims priority to U.S. Provisional Application No. 62/666,281, filed May 3, 2018, and entitled, "INTELLIGENT LEGAL RESEARCH SYSTEM," the disclosure of which is incorporated by reference herein in its entirety.

TECHNICAL FIELD

The present subject matter is directed generally to data searching, and more particularly to generating and identifying context specific answers to a query.

BACKGROUND

Existing question and answer (Q&A) systems generally operate as either factoid-based or non-factoid-based systems. Factoid-based systems receive queries regarding particular phrases and look for a specific noun-phrase in order to identify answers. For example, a user of a factoid-based Q&A system may input a question asking "when did world war 2 start?" The factoid-based Q&A system may identify the noun-phrase and find a factual answer. This is a well-studied problem. Non-factoid-based Q&A systems function to answer questions that may not be answered by a short fact. These systems may handle questions related to advice on a particular subject to requests for opinions on particular issues. Non-factoid Q&A systems look for longer spans of text that explain a concept. However, answering non-factoid questions presents a difficult problem.

One solution that has been proposed for implementing non-factoid Q&A systems involves passage retrieval. In this solution, a user may input a question, either as a natural language query or as a keyword query, and the most relevant part of a text/document is identified and then given as an answer to the question. However, this approach is inaccurate as it does not consider the actual context of the question. As such, the user is presented with a passage that is relevant, but that does not necessarily answer the question. The user is left with having to search through the identified passage for the actual answer, if it is even in there, which is highly inefficient.

Another solution involves summarization, which may include a computer generated summary of documents. In this solution, relevant bits and pieces of documents are extracted and put together to generate a summary of the document. However, the summaries are often nonsensical and are not necessary related to the actual context of the question. Another approach may also use natural language generation, but the results in this case often look like "word salad," as these systems are simply not sufficiently robust to generate a contextually and grammatically correct answer in response to a question.

SUMMARY

The present application relates to systems and methods for generating contextually, grammatically, and conversationally correct answers to input questions. In aspects, the contextually, grammatically, and conversationally correct answers represent a conversationally fluid response to the input questions, such that the user is presented with an answer that is responsive, accurate, and clear, and is within the context of the question as in a conversation. In one particular embodiment, a method includes receiving a query from a user terminal, the query including a question having a linguistic and syntactic structure, and analyzing the linguistic and syntactic structure of the question to determine at least a context of the question. The method also includes generating at least one search query based on analyzing the linguistic and syntactic structure of the question, causing the at least one search query to be executed on at least one data store, and obtaining a plurality of candidate answers in response to the execution of the search query. The method further includes obtaining a linguistic and syntactic analysis of each candidate answer of the plurality of candidate answers. The question is paired with each candidate answer of the plurality of candidate answers to form a plurality of question-answer pairs. The method also includes extracting at least one feature for each question-answer pair of the plurality of question-answer pairs, feeding the extracted at least one feature for each question-answer pair into a ranking model, and scoring, by the ranking model, for each feature of the at least one feature, each question-answer pair. A score for a particular question-answer pair resulting from the scoring represents a probability that the particular candidate answer of the particular question-answer pair is a correct answer to the question. The method further includes ranking the candidate answers of the plurality of candidate answers based on the score of each candidate answer, and providing at least one of the ranked candidate answers as answer to the question in the query.

In another embodiment, a system may be provided. The system may include a question/answer processor configured to receive a query from a user terminal, the query including a question having a linguistic and syntactic structure, and analyze the linguistic and syntactic structure of the question to determine at least a context of the question. The system may, also include a query generator configured to generate at least one search query based on the analyzing the linguistic and syntactic structure of the question, to cause the at least one search query to be executed on at least one data store, and to obtain a plurality of candidate answers in response to the execution of the search query. The question/answer processor is further configured to obtain a linguistic and syntactic analysis of each candidate answer of the plurality of candidate answers, and to pair the question with each candidate answer of the plurality of candidate answers to form a plurality of question-answer pairs. The system further includes a feature extractor configured to extract at least one feature for each question-answer pair of the plurality of question-answer pairs, and to feed the extracted at least one feature for each question-answer pair into a candidate ranker. The system also includes the candidate ranker configured to score, using a ranking model, for each feature of the at least one feature, each question-answer pair. A score for a particular question-answer pair resulting from the scoring represents a probability that the particular candidate answer of the particular question-answer pair is a correct answer to the question. The candidate ranker is also configured to rank the candidate answers of the plurality of candidate answers based on the score of each candidate answer. The system also includes an answer detector configured to provide at least one of the ranked candidate answers as answer to the question in the query.

In yet another embodiment, a computer-based tool may be provided. The computer-based tool may include non-transitory computer readable media having stored thereon computer code which, when executed by a processor, causes a computing device to perform operations that may include receiving a query from a user terminal, the query including a question having a linguistic and syntactic structure, and analyzing the linguistic and syntactic structure of the question to determine at least a context of the question. The operations also include generating at least one search query based on the analyzing the linguistic and syntactic structure of the question, causing the at least one search query to be executed on at least one data store, and obtaining a plurality of candidate answers in response to the execution of the search query. The operations further include obtaining a linguistic and syntactic analysis of each candidate answer of the plurality of candidate answers. The question is paired with each candidate answer of the plurality of candidate answers to form a plurality of question-answer pairs. The operations also include extracting at least one feature for each question-answer pair of the plurality of question-answer pairs, feeding the extracted at least one feature for each question-answer pair into a ranking model, and scoring, by the ranking model, for each feature of the at least one feature, each question-answer pair. A score for a particular question-answer pair resulting from the scoring represents a probability that the particular candidate answer of the particular question-answer pair is a correct answer to the question. The operations further include ranking the candidate answers of the plurality of candidate answers based on the score of each candidate answer, and providing at least one of the ranked candidate answers as answer to the question in the query.

The foregoing broadly outlines the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 4A shows an example of an implemented schema in accordance with aspects of the present disclosure;

FIG. 4B shows an example of a sample document schema for results of a headnote search within a frame implemented in accordance with aspects of the present disclosure;

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail, it should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1:
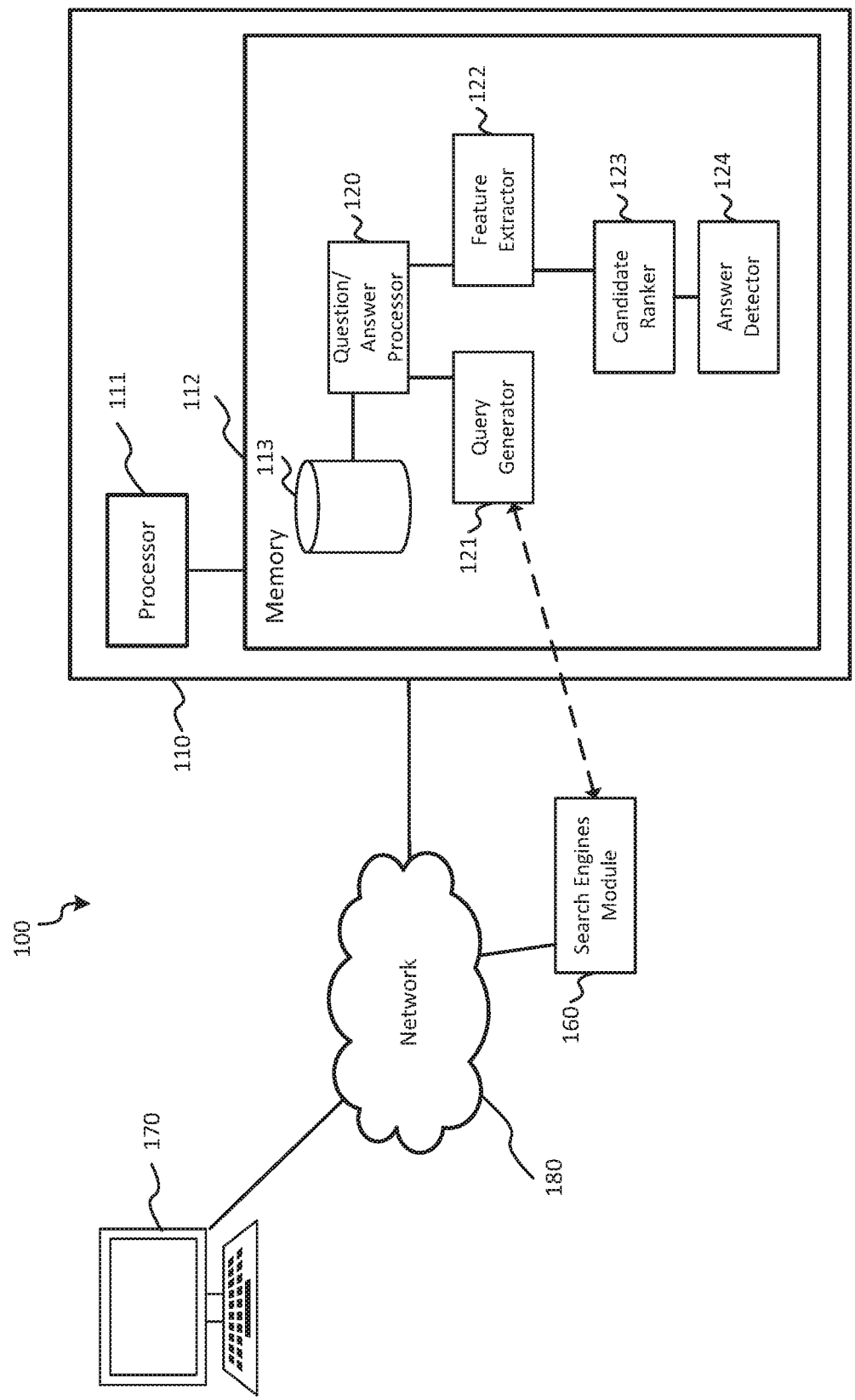
FIG. 1 shows a system configured to perform operations in accordance with embodiments of the present disclosure.

FIG. 1 is a block diagram of an exemplary system 100 configured with capabilities and functionality for generating contextually and grammatically correct answers to input questions in a conversationally fluid way, in accordance with embodiments of the present application. In aspects, as noted above, the contextually and grammatically correct answers may, be identified, obtained and/or generated from a database of pre-generated summaries, which are herein referred to as headnotes. In a particular implementation, headnotes may refer to editorially, created summaries of the law addressed in court opinions. As such, a conversationally fluid, contextually and grammatically correct answer to an input question may be provided as a short passage obtained from a headnote identified in accordance with aspects of the present disclosure. In some aspects, headnotes may be restricted to a single sentence.

As shown in FIG. 1, system 100 includes server 110, at least one user terminal 170, and search engines module 160. These components, and their individual components, may cooperatively operate to provide functionality in accordance with the discussion herein. For example, in operation according to embodiments, user terminal 170 may be used by a user to input a question. The question may be provided to server 110. The various functional components of server 110 may operate to process and analyze the question, and to identify and generate an answer that is contextually and grammatically correct and represents a conversationally fluid response to the question.

It is noted that the functional blocks, and components thereof, of system 100 embodiments of the present invention may be implemented using processors, electronics devices, hardware devices, electronics components, logical circuits, memories, software codes, firmware codes, etc., or any combination thereof. For example, one or more functional blocks, or some portion thereof, may be implemented as discrete gate or transistor logic, discrete hardware components, or combinations thereof configured to provide logic for performing the functions described herein. Additionally or alternatively, when implemented in software, one or more of the functional blocks, or some portion thereof, may comprise code segments operable upon a processor to provide logic for preforming the functions described herein.

It is also noted that various components of system 100 are illustrated as single and separate components. However, it will be appreciated that each of the various illustrated components may be implemented as a single component (e.g., a single application, server module, etc.), may be functional components of a single component, or the functionality of these various components may be distributed over multiple devices/components. In such aspects, the functionality of each respective component may be aggregated from the functionality of multiple modules residing in a single, or in multiple devices.

In some aspects, server 110, user terminal 170, and search engines module 160 may be communicatively coupled via network 180. Network 180 may include a wired network, a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between user terminal 170 and server 110.

User terminal 170 may be implemented as a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. User terminal 170 may be configured to provide a graphical user interface (GU) via which a user may be allowed to input a query that may include a question. The query may be communicated to server 110 over network 180. In aspects, user terminal 170 may be configured to provide a GUI via which an operator may conduct training operations and may provide training data for system 100. Training operations will be discussed in more detail below.

Search engines module 160 may be configured to receive a search query generated by server 110 (e.g., a search query generated by query generator 121, as discussed in more detail below) and to execute the search query against at least one search engine. The functionality of search engines module 160 will be described in more detail below.

Server 110 may be configured to receive a query, including a question, from a user, process and analyze the query to identify a question and its context, and to identify and generate an answer that is contextually and grammatically correct and represents a conversationally fluid response to the question, and to provide answer results to a user, in accordance with aspects of the present disclosure, as described in more detail below. Although FIG. 1 shows a single server 110, it will be appreciated that server 110 and its individual functional blocks may be implemented as a single device or may be distributed over multiple devices having their own processing resources, whose aggregate functionality may be configured to perform operations in accordance with the present disclosure. In some embodiments, server 110 may be implemented, wholly or in part, on an on-site system, or on a cloud-based system. Furthermore, those of skill in the art would recognize that although FIG. 1 illustrates components of server 110 as single blocks, the implementation of the components and of server 110 is not limited to a single component and, as described above, may be distributed over several devices or components.

As shown in FIG. 1, server 110 includes processor 111, memory 112, question/answer processor 120, query generator 121, feature extractor 122, candidate ranker 123, and answer detector 124. It is noted that the various components of server 110 are illustrated as single and separate components in FIG. 1. However, it will be appreciated that each of the various components of server 110 may be a single component (e.g., a single application, server module, etc.), may be functional components of a same component, or the functionality may be distributed over multiple devices/components. In such aspects, the functionality of each respective component may be aggregated from the functionality of multiple modules residing in a single, or in multiple devices.

In some aspects, processor 111 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some aspects, implementations of processor 110 may comprise code segments (e.g., software, firmware, and/or hardware logic) executable in hardware, such as a processor, to perform the tasks and functions described herein. In yet other aspects, processor 110 may be implemented as a combination of hardware and software. Processor 110 may be communicatively coupled to memory 112.

Memory 112 may comprise read only memory (ROM) devices, random access memory (RAM) devices, one or more hard disk drives (HDDs), flash memory devices, solid state drives (SSDs), other devices configured to store data in a persistent or non-persistent state, network memory, cloud memory, local memory, or a combination of different memory devices. Memory 112 may store instructions that, when executed by processor 110, cause processor 110 to perform operations in accordance with the present disclosure. In aspects, memory 112 may also be configured to facilitate storage operations. For example, memory 112 may comprise database 113 for storing any of headnotes, headnotes analyses, models, classifiers, rankers, usage metrics, analytics, user preferences, etc., which system 100 may use to provide the features discussed herein. Database 113 may be integrated into memory 112, or may be provided as a separate module. In some aspects, database 113 may be a single database, or may be a distributed database implemented over a plurality of database modules. In some embodiments, database 113 may be provided as a module external to server 110.

As noted above, in accordance with aspects of the present disclosure, system 100 provides functionality for analyzing the language and syntactic structure of a question entered by a user in order to identify an answer (e.g., at least one headnote from a plurality of headnotes stored in at least one database) that correctly answers the question in a grammatically, contextually, and conversationally correct way. In aspects, question/answer processor 120 may be configured to provide analysis of the question and analysis of candidate answers in order to facilitate identification and detection of the most correct answers. As used herein, "most correct" answers may refer to answers (e.g., headnotes), from a pool of candidate answers, that may be identified, scored, and/or ranked with respect to a probability that the answers are grammatically, contextually, and/or conversationally correct answers to the question.

Figure 2:
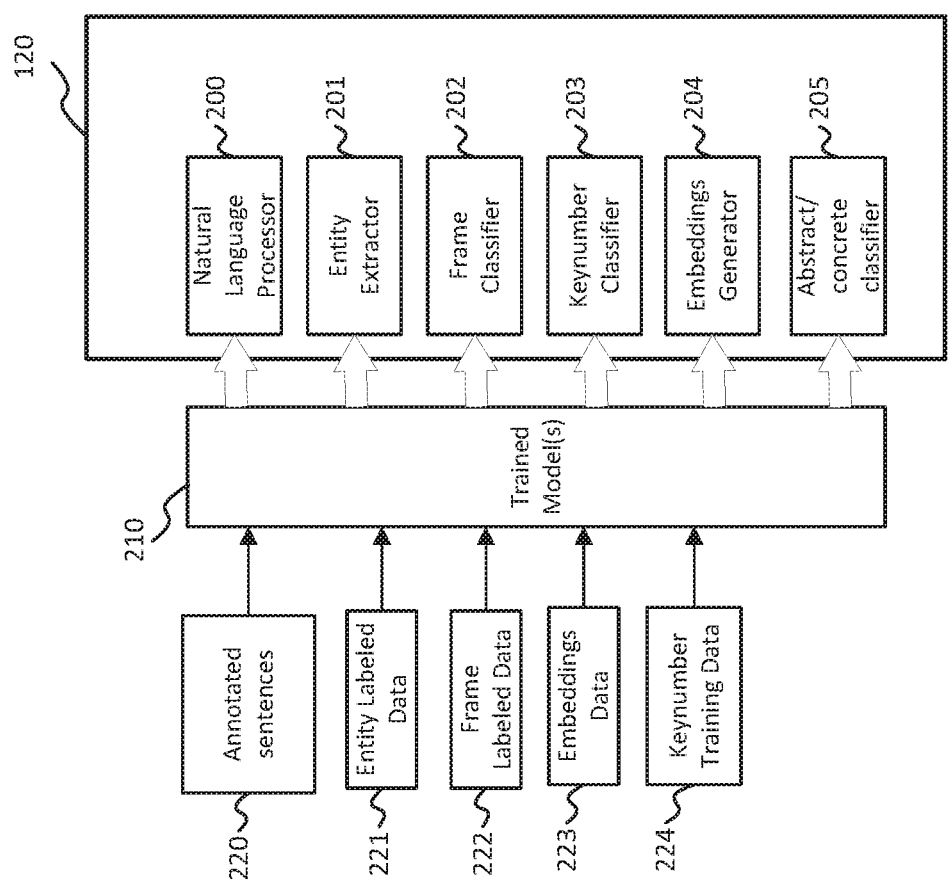
FIG. 2 shows a functional block diagram illustrating an example of a question/answer processor implements in accordance with aspects of the present disclosure.

The functionality of question/answer processor 120 will now be discussed with respect to the block diagram illustrated in FIG. 2. FIG. 2 shows a block diagram illustrating functionality of question/answer processor 120 for analyzing and processing questions in a user query, and potential candidate answers (e.g., headnotes). In embodiments, question/answer processor 120 may include natural language processor 200, entity extractor 201, frame classifier 202, key number classifier 203, and embeddings generator 204. It is noted that the configuration of question/answer processor 120 illustrated in FIG. 2 is for illustrative purposes, and other configurations may be used that may provide the functionality illustrated. In some implementations, different combination of the various functional components of question/answer processor 120 may be used (e.g., functional components may be aggregated, distributed, integrated within the same module etc.). As such, the configuration shown in FIG. 2 should not be construed as limiting in any way. It is also noted that the functionality of question/answer processor 120 may be applicable to processing of questions (e.g., questions received from user terminal 170) and/or processing of candidate answers (e.g., headnotes) received from search engines module 160.

Natural language processor 200 may be configured to provide linguistic structure analysis of a question and/or a headnote. In aspects, linguistic structure analysis may involve use of machine learning algorithms to tag parts of speech, identify syntactic relations, parse dependencies, and/or label semantic roles, to provide dependency parsing, to provide noun phrase, verb phrase, and sentence detection, etc. on the questions/headnotes. For example, natural language processor 200 may analyze a question/headnote and may identify its basic structure, identifying linguistic components such as subject, verb, objects, what is done to whom, subordinate clauses, main clauses, main verb, main verb tense, etc. Natural language processor 200 may use models (e.g., trained model(s) 210) in the linguistic structure analysis. In aspects, before trained model(s) 210 may be used by natural language processor 200, trained model(s) 210 may be trained for natural language processing using annotated sentences 220 from varied domains. The trained natural language processing models may be stored in database 113.

In one particular example, natural language processor 200 may process a question submitted by a user via user terminal 170, or submitted by an operator for training models. In this example, the question may be "what is the burden of proof for entry of a default judgment in a breach of contract case?" Natural language processor 200 may provide syntactic analysis. For example, natural language processor 200 may generate the dependency parse tree illustrated in Table 1, showing syntactic relations for each word in the question.

TABLE 1

Dependency Parse Tree

```
|___ ROOT
     |___ is|root
          |___ what|attr
          |___ burden|nsubj
          |    |___ the|det
          |    |___ of|prep
          |    |    |___ proof|pobj
          |    |___ for|prep
          |         |___ entry|pobj
          |              |___ of|prep
          |                   |___ judgement|pobj
          |                        |___ a|det
          |                        |___ default|compound
          |                        |___ in|prep
          |                             |___ case|pobj
          |                                  |___ a|det
          |                                  |___ breach_of_contract|compound
          |___ ?|punct
```

As can be seen from Table 1, the dependency parse tree may include the following binary relations: [attr(what, be), det(the, burden), nsubj(be, burden), prep(burden, of), pobj (of, proof), prep(burden, for), pobj(for, entry), prep(entry, of), det(a, judgment), compound(default, judgment), pobj (of, judgment), prep(entry, in), det(a, breach), pobj(in, breach), prep(breach, of), compound(contract, case), pobj (of, case), punct(be, ?)]. In aspects, natural language processor 200 may trim the list of binary relations and may collapse certain relations in order to more directly capture syntactic dependencies between significant words in the question. Both semantic role and grammatical function may be considered when selecting "significant" terms. In the example above, collapsing dependencies between semantically heavy lemmas may yield the following: nsubj(be, burden), prep_of(burden, proof), prep_for(burden, entry), compound(default, judgment), prep_of(entry, judgment), compound(breach of contract, case), prep_in(judgment, case). In some aspects, the dependency parsing results for questions/headnotes may be stored in database 113.

In aspects, natural language processor 200 may also be configured to apply maximum entropy chunking models to the questions/headnotes and to extract simple noun and verb phrases from the output of the maximum entropy chunking models applied.

Natural language processor 200 may also be configured to perform sentence detection. Although in some embodiments sentence detection may not be performed for questions, sentence detection may be applied to headnotes. Although headnotes may be constrained to a single sentence in some implementations, headnotes may include citations at the end, which may be embedded in the source text. A language pattern of a sentence with a citation at the end may not occur often in the open domain corpora used to train natural processing language models, and thus, may create issues. Natural language processor 200 may use a generic model for sentence detection combined with special rules in order to excise citation text from the body of the headnote before processing.

Natural language processor 200 may also be configured to provide additional attention identifying the main verb, or its nearest tensed coordinate, of a headnote. Main verb identification is an input to an Abstract/Concrete classifier (discussed in more detail below), as there may be a tendency to state abstract rules of law in present tense and concrete applications of the law in the past tense.

Natural language processor 200 may perform syntactic analysis on every question, every headnote, and/or every identified candidate answer to the question. In aspects, the output of natural language processor 200 may be passed directly to feature scoring functions (e.g., feature scoring functions of feature extractor 122), and/or may be passed to other functional components of question/answer processor 120. In alternative or additional aspects, the output of natural language processor 200 may be stored in database 113.

Entity extractor 201 may be configured to detect entities in questions and/or answers. In aspects, once the syntactic structure of a question/headnote has been parsed, entity extractor 201 may apply functionality to identify concepts or entities strongly associated with the semantics of the question/headnote. It is noted that the terms "concept" and "entity" may be used interchangeably herein. In aspects, entity extractor 201 may use various approaches to detect entities in questions and answers. In one approach, entity extractor 201 may use a machine learning module, e.g., trained model(s) 210 to detect entities in the questions/headnotes. In aspects, before trained model(s) 210 may be used by entity extractor 201, trained model(s) 210 may be trained for entity extraction using entity labeled data 221 from varied domains/sources. The trained entity extraction models may be stored in database 113.

In another approach, entity extractor 201 may use lookup taggers to detect entities. Lookup taggers may contain lists of phrases mined from the headnote corpus and other content in the appropriate domain (e.g., the domain of the query, such as legal, financial, academic, political, etc.). Phrases may be mined from sources (e.g., editorial sources) including marked definitions and acronyms, back of book indices, and/or popular names for statutes and cases. Phrases may also be derived directly from unstructured text based on a probability of occurrence and co-occurrence in particular contexts. In aspects, some of the mined lists may be supplemented with editorially curated entries.

In addition, or in the alternate, to the lookup tagger-based approach, entity extractor 201 may use statistical taggers to detect entities. In aspects, statistical taggers may be trained via a process that may leverage small amounts of labeled data, as well as the application of handcrafted rules. Entity extractor 201 may run statistical taggers implemented as conditional random fields. In aspects, statistical taggers may be trained to recognize a set of domain-specific entities. For example, statistical taggers may be trained to recognize "Source of Law," "Evidence Type," "Cause of Action," "Tolling Condition," and "Defined Term" entities.

In some implementations of the statistical tagger-based approach, separate models may be trained for questions and headnotes. For questions, a training process may involve tagging a large sample of questions from query logs with rules implemented in a framework for defining cascaded patterns over token sequences. In these implementations, an iterative and semi-manual review process of the tagged output from the framework may provide training data for the statistical taggers. The statistical tagger may learn by example based on features defined for the input. The defined features may include a number of lexical and syntactic cues, such as word prefixes/suffixes, the presence of numbers and capitalized letters, and part-of-speech/dependency labels. This approach may also leverage word clusters created over Word2Vec embeddings (e.g., by embeddings generator 204).

Frame classifier 202 may be configured to classify the questions/headnotes into at least one frame. A frame, or semantic frame, may refer to a coherent structure of related concepts, or entities, where the relationships between the concepts are prototypical given their frequent realization in actual usage. In operations according to aspects of the present disclosure, frame classifier 202 may classify all questions, headnotes, and/or candidate answers to an intent. In doing so, frame classifier 202 may analyze each of the questions and answers and may divide them into categories. For example, frame classifier 202 may determine whether the question/headnote is looking for or providing information on a definition, a statute of limitations, damages, etc. In that sense, frame classifier 202 may determine the intent of the question/headnote. As used herein, a frame may refer to such an intent, or category. In aspects, frame categories may be informed by editorial characteristics of the headnotes. For example, in one particular implementation, a number of categories may be provided. In one particular example, thirteen categories, or frames, may be provided (e.g., Admissibility, Availability of Damages or Remedy, Burden of Proof, Construction of Instruments, Court Authority, Elements, Factors, and Tests, Accrual of Statute of Limitations, Tolling of Statute of Limitations, Duration of Statute of Limitations, Standard of Review, Enforceability of Contracts, and Others). It will be appreciated that these thirteen frames are provided for illustrative purposes. Other, and additional frames may be used, and or more or less than thirteen frames may be used. As such, the description of thirteen frames herein should not be construed as limiting in any way.

In aspects, frame classifier 202 may classify a question/headnote into a category, or into multiple categories. Identifying to which category a question belongs facilitates identification of a correct answer because this may also identify to which category the answer may belong. In aspects, the frame of a question and the frame of the ideal answer to the question may be the same. Additionally, questions that may be answered by a single headnote may be restricted to a single frame. In other aspects, headnotes that classify into more than one frame may be dispreferred as answers, unless one frame may be clearly dominant. This is partly because single-sentence headnotes discussing points of law from multiple perspectives may tend to be quite long, and sentence length may be inversely related to readability. Thus, especially when the answer is not prominent, the headnote may read as a conversationally disfluent response.

Table 2 shows a structure of an example frame (e.g., burden of proof frame).

TABLE 2

Burden of Proof Frame

Frame name: BURDEN-OF-PROOF
Frame Elements: PARTY, CLAIM/REMEDY, STANDARD
Prototypical Questions:
    What is the burden of proof on a [PARTY] seeking [REMEDY]?
    What is the burden of proof on [PARTY] to establish [CLAIM]?
    Who has the burden of proof on a [REMEDY]?
Prototypical Answers:
    Burden is on [PARTY] to establish [CLAIM] by [STANDARD]
    [STANDARD] applies to a [PARTY] seeking [REMEDY]
Definitions:
PARTY: The party which bears the burden of proving a particular crime, cause of action, defense, or the burden of persuasion in obtaining a remedy.

TABLE 2-continued

Burden of Proof Frame

CLAIM/REMEDY: That which the burdened party seeks to establish or obtain from the court.
The remedy in this context is often a ruling on the party's motion.
STANDARD: The legal standard applicable to specific burden of proof, Examples include "Reasonable Suspicion", "Preponderance of the Evidence", or "Clear and Convincing Evidence".

As shown in Table 1, frame elements of a frame may be defined with respect to the particular frame. For example, the burden of proof frame may include the following entities as frame elements "party," "claim/remedy," and "standard." It is noted that, in aspects, the same entity type may occur in multiple frames, although the entity type may have a different role in each frame.

Following the example discussed above, a question may be submitted by a user via user terminal 170, or submitted by an operator for training models. The question may be "what is the burden of proof for entry of a default judgment in a breach of contract case?" With respect to the functionality of frame classifier 202, frame classifier 202 may determine that the question fits the Burden of Proof frame with one element, "default judgment," as the "claim/remedy" frame element. In some embodiments, a question/headnote may be classified as belonging to a particular frame when the question/headnote includes at least one element of the particular frame. In other aspects, a question/headnote may be classified as belonging to a particular frame when the question/headnote includes a threshold number of the elements of the particular frame. For example, in the example above, a question may be classified as belonging to the burden of proof frame only when the question includes at least a threshold number of the three frame elements (e.g., one, two, or three elements). In some cases, all elements must be found in the question/headnote in order to classify the question/headnote into the frame. In yet other aspects, a question/headnote may be classified as belonging to no frame.

In aspects, a correct answer to a question may also be classified into the same frame as the question. For example, a correct answer to the above example questions may be: "In a motion to set aside default judgment or an entry of default, movant bears burden of proving the grounds for relief by clear, strong, and satisfactory proof." In this case, the correct answer also fits the Burden of Proof frame and contains three frame elements: "default judgment" (the claim/remedy), "movant" (the party), and "clear, strong, and satisfactory proof" (the standard).

In some embodiments, frame elements may be optional in any particular implementation of a frame. In these cases, a frame may be evoked in the absence of frame elements based on lexical triggers associated with an underlying action or event being present in the question/headnote and the frame. In some cases, a headnote/answer may contain a different set of frame elements than the question. For example, questions starting with words like "who," "what," and "when" may be looking for a specific frame element in the answer. Polar questions, on the other hand, may contain the same set of frame elements as the corresponding answer.

Frame classifier 202 may classify questions/headnotes into frames using a machine learning module, e.g., trained model(s) 210 to identify frames to which the questions/headnotes belong. In aspects, before trained model(s) 210 may be used by frame classifier 202, trained model(s) 210 may be trained for frame classification using frame labeled data 221 from varied domains/sources. The trained frame classification models may be stored in database 113.

In another approach, frame classifier 202 may use text classification rules to recognize questions/headnotes belonging to a particular frame. Under this approach, prototypical questions for each frame may be previously identified (e.g., by subject matter experts during development of frame definitions). A set of rules may then be used to extract queries from query logs that matched patterns of language observed in the prototypical questions, as well as related queries that fall outside of the definition of each frame but contain enough overlap with the frame intent to serve as useful training data. The identified queries for each frame may then be examined and judged whether or not each query is a valid instance of the frame. The frame labels may be used to train a neural network model in order to improve the precision of the rules.

In aspects, the output from frame classifier 202 may identify the language patterns that were matched from the question based on the rules, and also the classification scores from the model classification, for the identified frame. For example, Table 3 illustrates an output of frame classifier 202 based on the example above. In this example, the output from frame classifier 202 may identify the language patterns matched to the burden of proof frame based on the text classification rules. Additionally, the output from frame classifier 202 may identify the classification scores from the model for the burden of proof frame.

TABLE 3

Frame Classifier Output

"question": "What is the burden of proof for entry of a default judgement in a breach of contract case?",
"frame": {
    "name": "burden_of_proof"
},
"rule_annotations": {
    "start": 12,
    "end": 27,
    "pattern": "burden (of|to) (pro(of|v)|show|demonstrat|establish|persuasion|production)",
),
"classification": |
    "model": "burden_of_proof",
    "labels": [ "___label___Y",
                 "___label___N" ],
    "scores": [ 0.9980469,
              1.9531265E-8 ]
}

Figure 3:
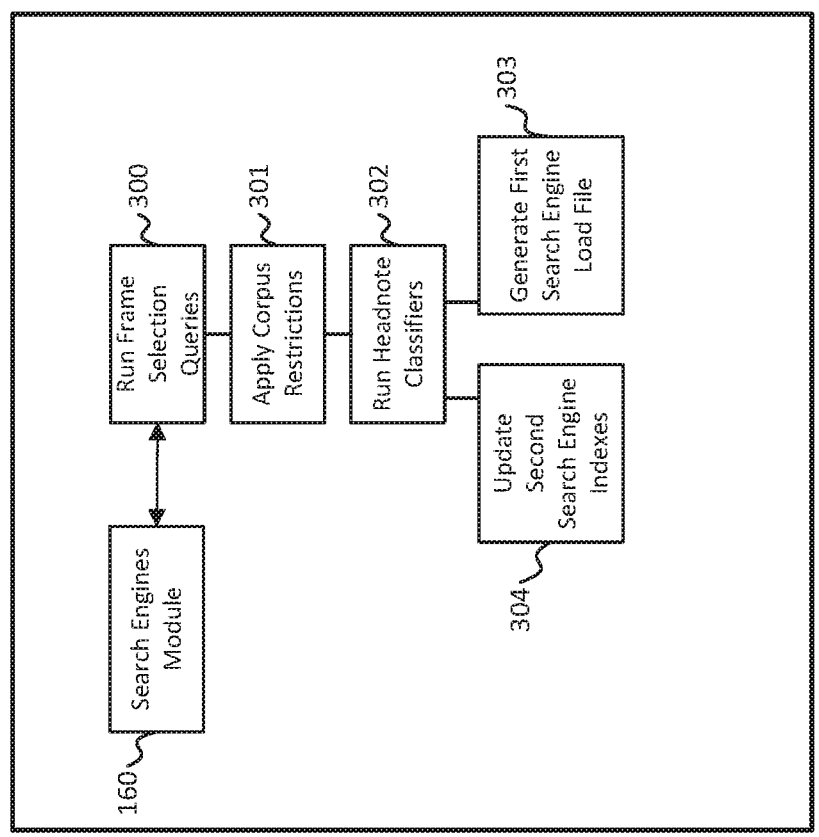
FIG. 3 shows a flow diagram illustrating a functional flow for classifying headnotes into frames to be used during operations in accordance with aspects of the present disclosure.

FIG. 3 shows a flow diagram illustrating a functional flow for classifying headnotes into frames to be used during operations. In embodiments, the functional blocks of FIG. 3 may be performed by various components of system 100, in accordance with the description above. At block 300, frame selection queries may be run against a search engine. For example, a high-recall query may be executed against a first search engine of search engines module 160 in order to gather text/documents including headnotes. At block 301, corpus restrictions may be applied. For example, headnotes that may be offered as candidate answers may be restricted by, dates, may exclude headnotes that include bad words, etc.

At block 302, headnote classifiers are executed against the headnotes obtained at block 300, and restricted at block 301. In aspects, the headnote classifiers may include frame classifiers, such as in accordance with the functionality of frame classifier 202. Running the headnote classifiers may result in identification of headnotes that are in frames. At block 303, a load file for the first search engine may be generated based on the headnotes identified as belonging to a frame. Similarly, at block 304, the indexes of a second search engine may be updated based on the headnotes identified as belonging to a frame. In this manner, a collection of headnotes belonging to frames, which will be appreciated may be smaller than the entire headnote corpus, may be generated. Identifying headnotes that are in frames facilitates optimization of operations because it allows the system to avoid running queries against all headnotes. Instead, queries to identify candidate answers to a question may be limited to queries against the headnotes that are in frames. As such, the chances of obtaining a correct answer is increased, and the resource requirements are decreased. In addition, running queries against different search engines diversifies the results (e.g., candidate answers) for a particular question.

Figure 5:
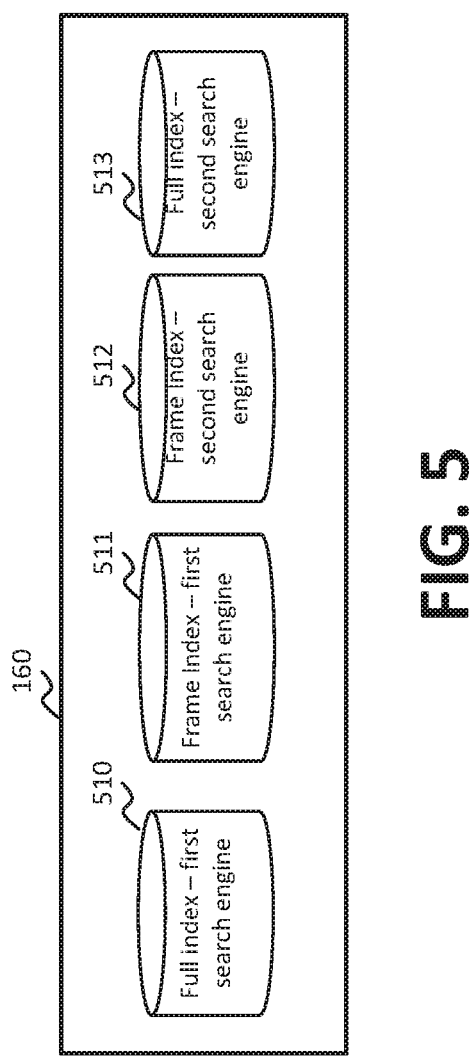
FIG. 5 illustrates an example configuration of a search engines module implemented in accordance with aspects of the present disclosure.

In aspects, functionality of search engines module 160 may facilitate headnote classification and search queries. Search engine module 160 may interface with more than one search engine, and/or may include more than one search engine data stores associated with search engines. For example, FIG. 5 illustrates a configuration of search engines module 160. Search engines module 160 may include at least four data stores associated with two search engines. Data store 510 may be associated with a full index store of a first search engine. In this example, all headnotes available in the corpus may be indexed in data store 510. In some aspects, the full index data store 510 may still be restricted by date or key number, but may not be restricted by frame. As such, even headnotes that are not associated with a frame may be included in data store 510. Data store 511 may include a frames index store of the first search engine. In this example, data store 511 may include headnotes that are associated with at least one frame, as described herein. Data store 512 may include a frames index store of a second search engine. In this example, data store 512 may include headnotes that are associated with at least one frame, as described herein. Data store 513 may be associated with a full index store of the second search engine. In this example, all headnotes available in the corpus may be indexed in data store 513. As such, even headnotes that are not associated with a frame may be included in data store 513.

Referring back to FIG. 2, key number classifier 203 may be configured to classify questions/headnotes into a key number of a research taxonomy. For example, the Westlaw Key Number System is a legal taxonomy with over 120 K fine-grained categories. In aspects, all headnotes may be assigned a key number assigning a point of law to one or more categories. In one approach, key number classifier 203 may use a machine learning module, e.g., trained model(s) 210 to classify questions/headnotes into key numbers. In aspects, before trained model(s) 210 may be used by key number classifier 203, trained model(s) 210 may be trained for key number classification using key number training data 224 from varied domains/sources. The trained key number classification models may be stored in database 113.

The classification scheme of the Key Number system is complex and user questions may generally underspecify a category relative to the taxonomy. For example, in one case, there may be multiple headnotes representing a correct answer to a question. In this case, it is not expected to find all of these headnotes under the same key number. There may be, however, a tendency in a set of correct answers to have fewer distinct key numbers among the answers, whereas incorrect answers in the same search result may not exhibit this tendency. Based on this tendency, in aspects, key number classifier 203 may leverage the association between a question's intent and a key number classification. For example, a question and a candidate answer may be processed by key number classifier 203 through a Key Number classifier. The results of the key number classification of the question and the candidate answer may be compared for similarity (e.g., by feature extractor 122). In aspects, the predicted classifications for the question may also be compared to the manually assigned key numbers for each headnote.

Table 4 shows an example output from key number classifier 203, for a particular example question.

TABLE 4

| Key number classifier output | |
|---|---|
| "recommendations": [<br>{<br>    "description": "228k162(2). Presumptions and burden of proof",<br>    "categoryId": 83424,<br>    "compositeScore": 0.008,<br>    "probabilityScore": 0.018<br>},<br>{<br>    "description": "95k322(1). Presumptions and burden of proof",<br>    "categoryId": 76838,<br>    "compositeScore": 0.011,<br>    "probabilityScore": 0.005<br>},<br>{<br>    "description": "95k348. Presumptions and burden of proof",<br>    "categoryId": 77424,<br>    "compositeScore": 0.012,<br>    "probabilityScore": 0.002<br>}<br>] | "recommendations": [<br>{<br>    "description": "228k162(2). Presumptions and burden of proof",<br>    "categoryId": 83424,<br>    "compositeScore": 0.174,<br>    "probabilityScore": 0.034<br>},<br>{<br>    "description": "157k91. Party asserting or denying existence of facts",<br>    "categoryId": 49942,<br>    "compositeScore": 0.035,<br>    "probabilityScore": 0.003<br>},<br>{<br>    "description": "228k392(2). Presumptions and burden of proof",<br>    "categoryId": 84081,<br>    "compositeScore": 0.048,<br>    "probabilityScore": 0.002<br>}<br>] |

Table 4 shows recommendations for the question text on the left column, and recommendations for a candidate answer on the right column. In this example, the output shows the top 3 recommendations for each. In some aspects, distributions over the top 100 key numbers may be considered. This example illustrates (1) the degree of specificity in key numbers exceeding that of the question (e.g., four distinct key numbers characterize "Presumptions and burden of proof"), and (2) the overlap between predictions on the question and the headnote.

Embeddings generator 204 may be configured to provide modeling of the semantic space of a particular document and/or headnotes, and to predict the distribution of words and word sequences within the document and/or headnotes. In aspects, embeddings generator 204 may provide doc2vec and word2vec functionality. This doc2vec and word2vec approaches represent neural language modeling tools. By modelling the semantic space of a document/headnote, the system may identify what components or elements of questions and answers are most similar in this semantic space. Word2vec models the co-occurrence patterns of words in a corpus. Doc2vec extends this approach with an explicit representation characterizing the co-occurrence of words in a document. The output of each may include vectors that may be used to determine the similarity of a candidate answer to the question. In aspects, embeddings generator 204 may use a machine learning module, e.g., trained model(s) 210 to generate embeddings for questions/headnotes. In aspects, before trained model(s) 210 may be used by embeddings generator 204, trained model(s) 210 may be trained for embeddings generation using embedding training data 223 from varied domains/sources. The trained embedding generation models may be stored in database 113.

In aspects, abstract/concrete classifier 205 may be configured to classify headnotes as abstract (e.g., statements of law in some specific implementations) or concrete (e.g., applications of the law in a particular specific implementation). In a particular application in the legal field, past tense headnotes may describe facts of cases and may be classified as concrete, and present tense headnotes may describe the legal concept of the case and may be classified as abstract. Abstract headnotes may make better answers because abstract headnotes tend to be more generic, and may contain less extraneous information in answering a user's under-specified questions. In aspects, abstract/concrete classifier 205 may use a machine learning module, e.g., trained model(s) 210 to classify questions/headnotes as abstract or concrete. In aspects, before trained model(s) 210 may be used by abstract/concrete classifier 205, trained model(s) 210 may be trained for abstract/concrete classification using training data from varied domains/sources. The trained abstract/concrete classification models may be stored in database 113.

As described above, question/answer processor 120 may be configured to provide analysis of the question and analysis of candidate headnotes in order to facilitate identification and detection of the most correct headnotes. In aspects, question analysis may be performed at runtime (e.g., during a Q&A session in which a question, or questions, may be submitted by a user). After candidate headnotes may be identified as candidate answers, headnote analysis may be performed on the candidate answers. In some aspects, however, headnote analysis may additionally and/or alternatively be performed prior to runtime (e.g., prior to the Q&A session in which the question(s) may be submitted by the user). The pre-computed headnotes analysis may be stored, or cached, in database 113, and may be retrieved, for each identified candidate answer, during runtime. Caching the headnote analysis provides a performance optimization, as system resources may not need to be used during runtime for performing headnote analysis. Nonetheless, in some implementations, headnote analysis may be done at runtime, as described above.

In some embodiments, headnote analysis may also include converting a headnote from one format to a standardized format. For example, headnotes may be obtained from a database or collection of headnotes, and the headnotes may be in extensible markup language (XML) format. In a particular example, the XML headnotes may be parsed and converted into a JavaScript object notation (NON) format. The headnotes may also be grouped by ID. In some implementations, a same headnote may be associated with many cases, and in this case, grouping the headnotes by ID may be beneficial.

Referring back to FIG. 2, system 100 may include query generator 121. Query generator 121 may be configured to generate a search query, based on a question in a user query, and to execute the search query against at least one search engine to obtain candidate answers to the question. As noted above, aspects of the present disclosure provide functionality for generating contextually and grammatically correct answers to input questions, which answers provide a conversationally fluid response to the questions. The corpus of potential answers may be derived from headnotes and in some implementations may contain a number of documents in the order of tens of millions classified to a number of topics in the order of hundreds of thousands. As scoring and ranking the potential answers based on linguistic analysis may be computationally expensive relative to scoring and ranking techniques used for searching (e.g., by search engines), and also as the entire system may run dynamically from a global search box, optimization of the search query for obtaining candidate answers to a question is an important factor. The functionality of system 100 described above provides for linguistic and syntactic analysis of questions and headnotes. The functionality of query generator 121 may provide for optimization by narrowing down the universe of candidate answers to consider.

Query generator 121 may be configured to retrieve at least one candidate answer to an input question by sending and/or executing at least one search query against one or more search engines, and receiving the candidate answer results from the one or more search engines. In aspects, different search engines may implement different retrieval algorithms. For example, the different search engines may index, score, and rank results against a search query differently. As such, running search queries against different search engines may diversify the results (e.g., candidate answers) for a particular question. In some aspects, results obtained from the various search engines may overlap, and/or may include unique documents. In this case, these unique documents may not be significantly less likely to include correct answers. As such, running search queries against different search engines may diversify the results (e.g., candidate answers) for a particular question.

For example, as discussed above with respect to FIG. 5, search engines module 160 may include at least four data stores associated with two search engines. In this case, query generator 121 may generate at least four search queries, at least one search query for each of the four data stores 510-513. In some aspects, the search query generated for the various search engines, and/or data stores, may be the same query, or may be a different query based on the search engine and/or data store to which the search query may be sent. In still other aspects, a different query may be generated for different frames (e.g., a semantic search as discussed below).

In embodiments, query generator 121 may be configured to generate and execute at least three types of queries. One type of query that query generator 121 may generate and execute against at least one search engine may include a natural language search. A natural language search may use the text of the question for which candidate answers are to be obtained as the search query. In some implementations, a natural language search on the text of the question text may be the default search query type executed by query generator 121, and may be applied to all submitted questions. In some aspects, a natural language search may be executed against headnote indexes created in the first and second search engines of search engines module 160.

Another type of query that query generator 121 may generate and execute against at least one search engine may include a "more-like-this" search with a candidate answer as the query. In this type of query, the pool of potential answers may be increased after an initial set of candidates have been scored. A "more-like-this" search may be used mainly to expand coverage for specific jurisdictions. For example, a "more-like-this" search may be used to search for headnotes that closely match high scoring answers from outside the user's jurisdiction.

Yet another type of query that query generator 121 may generate and execute against at least one search engine may include a structured search based on question, entities, and frame information obtained by question/answer processor 120 in accordance with the description above. Also referred to herein as a semantic search, a structured search may be based on frame-specific structured queries. In this manner, query generator 121 may leverage frame classification functionality of system 100 on both questions and answers. As described above, questions may be classified at runtime, and candidate answers may be classified either at runtime or offline, and may be stored in a separate index (e.g., frame index data stores 511 and 512). In this sense, as also mentioned above, query generator 121 may target the particular subset of headnotes evoking the same semantic frame as the question. In some cases, it may also be advantageous to target specific frame elements.

Query generator 121 may be configured to generate and execute semantic searches by adding structure to the information request sent to the various search engines such that user intent in the question may be more precisely specified to the search engine. In embodiments, a semantic search may produce search results (of candidate answers) that may be more relevant to the user's question because the search results better match the underlying semantics of the question. Query generator 121 may leverage semantic search functionality for questions belonging to known frames by using frame-specific search templates. In aspects, frame-specific search templates may be associated with particular frames, and may include placeholders for specific frame elements of the associated frame. In these cases, recognized entities in the question (e.g., based on question analysis as described above) may be used to replace the placeholders in the frame-specific search template to produce a fully formed search query for execution against a search engine.

FIG. 4 shows an example of a frame-specific search template. In this example, frame-specific search template 400 may be associated with the Burden of Proof frame, and may define two elements: PARTY and CLAIM/REMEDY. A particular query specified for an input question determined to be associated with the Burden of Proof frame (e.g., by question analysis) may specify these two elements. For example, a question may be submitted, and analyzed by question analysis, "what is the burden of proof on debtor to establish breach of contract?" Frame classification of the input question may determine the PARTY as the "debtor," and the CLAIM/REMEDY as "breach of contract." In this case, the place holders for the PARTY and CLAIM/REMEDY elements of the Burden of Proof frame-specific search template 400 may be replaced with the "debtor" and "breach of contract" elements identified in the input question, to generate a fully formed search query to be executed against at least one search engine. FIG. 4B shows an example of a sample document schema 410 for results of a headnote search within a frame.

Referring back to FIG. 2, system 100 may include feature extractor 122. Feature extractor 122 may be configured to extract features from the candidate question-answer pairs obtained by query generator 121 in order to score and rank the candidate answers. In some aspects, before features may be extracted from the candidate question-answer pairs, duplicate candidates are eliminated. Feature extractor 122 may extract a relatively large number of features from the candidate question-answer pairs. In some implementation, feature extractor 122 may extract more than 200 features. Features extracted by feature extractor 122 may include linguistic similarity features, concept coordination features, topicality features, abstract/concrete classification features, and/or key number scoring functions. It will be appreciated that many other types of features may be extracted from the candidate question-answer pairs, and the discussion herein of the specific extracted features by way of illustration, and not limiting in any way.

In aspects, linguistic similarity features extracted from the candidate question-answer pairs by feature extractor 122 may include feature scoring functions for the syntactic analyses described above with respect to the question/answer processor. These feature scoring functions may measure overlap and alignment between the question and a respective candidate answer in a candidate question-answer pair of the candidate question-answer pairs. Various linguistic similarity features may compute the alignment between noun phrases, dependency relations, and verb phrases in the question and the respective candidate answer. Scoring functions may include basic set metrics (e.g., union, intersection, symmetric difference) as well as a means for summarizing the optimal alignment of every item from the question onto a unique item from the candidate answer. Some of the alignment scoring functions may measure string similarity, while others may use word embeddings to measure token-token similarity. In embodiments, two word embedding models may be used: one general model trained on an open domain corpus, and one domain-specific model trained on the headnote corpus.

In aspects, concept coordination features extracted from the candidate question-answer pairs by feature extractor 122 may include positional features. Positional features may capture the intuition that concepts in a question are more likely to occur closer together in correct answers than in incorrect answers in the same search result. In embodiments, distance between the concepts may be measured over the syntactic parse tree, as well as token and character offsets. The parse tree distance may better capture coordination of arguments, while the syntactic parser may be prone to error in some implementations. Using both inputs makes the system more robust to cascading errors.

In aspects, topicality features extracted from the candidate question-answer pairs by feature extractor 122 may include features that determine the topicality of a question and candidate answer by analyzing the position of concepts. In embodiments, headnotes that read like a natural answer to a question may include concepts from the question in a "topic" position. In English, the topic position may often be near the beginning of a sentence. Highly-rated answers may have a strong tendency to exhibit this pattern of including the topic position at the beginning of the sentence, and topicality features may identify the pattern. Correct answers may also have question concepts near the root of the headnote's syntactic parse tree. Both these tendencies, the topic position at the beginning of the sentence and near the root of a parse tree, may be captured by the topicality features extracted by feature extractor 122.

In aspects, feature extractor 122 may also be configured to extract abstract/concrete classification features. As discussed above, abstract/concrete classification may be performed by an abstract/concrete classifier (e.g., abstract/concrete classifier 205). As noted above, the abstract/concrete classifier may be a rule-based classifier that may identify whether a headnote is written in present or past tense, and may classify the headnote as either abstract or concrete.

In aspects, feature extractor 122 may also be configured to extract key number scoring features. Key number features may measure a divergence of the probability distributions over key numbers predicted for a question and a headnote separately. The divergence may be calculated over the fine-grained categories of the Key Number system, and over higher-level topics within the Key Number taxonomy. Additionally, key number features may score a match between predictions on the question and manually assigned categories for the headnote. Distinct features may look at the rank and probability score of manually assigned Key Numbers that are predicted for the question.

Candidate ranker 123 may be configured to apply an ensemble classification model based on the extracted features to rank the candidate question-answer pairs. In aspects, each question submitted may generate a question-answer pair for every candidate answer in the search results. For each feature of the extracted features, each question-answer pair may be scored. Each feature score of each question-answer pair may be fed into the ensemble classification model, and the ensemble classification model may generate a score that may represent the probability that the candidate answer in the candidate question-answer pair is a correct answer for the question. In aspects, each candidate question-answer pair may be analyzed independently by candidate ranker 123. Candidate ranker 123 may use the score for each of the candidate question-answer pairs to rank the answers from high to low probability.

In some aspects, the ensemble classification model may represent a combination of the features extracted by feature extractor 122. In embodiments, the ensemble classification model may implement gradient boosted decision trees. Training of the ensemble classification model may be performed by optimizing a logistic loss function. In this sense, the ensemble classification model may be a supervised model that may learn by example from question-answer pairs, which may be pre-graded as correct or incorrect.

Answer detector 124 may be configured to provide post-ranking processing of the candidate question-answer pairs, and to identify the candidate answers to be provided as answers to the submitted question. In aspects, post-ranking processing may include constraint checking and score weighting. Constraint checking may include implementing constraint rules to the results of candidate ranking model, rather than the input. In aspects, these constraint rules may ensure that candidate answers to a question in a particular frame contain certain elements required by that frame. For example, for the Admissibility, Construction of Instruments, and Statute of Limitations Tolling/Accrual/Duration frames, constraint rules may be applied. In one particular example, a candidate answer for a question in the Statute of Limitation Duration frame may be constrained to require a duration (e.g., a month or a year). If the candidate answer does not meet the constraint rule, the candidate answer is eliminated from the results. Additionally, for any frame, source of law and cause of action entities that may be found in the question may be required to be present in the answers. Score weighting rules may be used to penalize mismatches between the questions and answer frame more strictly than the model otherwise would, or to boost an answer. For example, for questions seeking a definition of a word/phrase, the rank of candidate answers having the actual word/phrase, or the word "means," might be boosted.

In aspects, answer detector 124 may apply a threshold determination to identify the candidate answers to be provided as answers to the submitted question. The threshold determination may determine whether or not to provide an answer as response to the question based on a confidence in correctness of the candidate score. As the ensemble classification model outputs a probability of an answer being a correct answer, a threshold may be set on the probability scores. In this case, any candidate answer meeting or exceeding the threshold may be provided as an answer to the question. The thresholds may be predetermined based on system and/or business requirements that may weigh the relative cost of showing incorrect answers against the cost of a system with lower coverage, e.g., a system that fails to show any answer a larger percentage of the time. Thresholds may also be used to weigh the relative proportion of candidate answers received from different search engines in response to the search queries.

In embodiments, the detected answers may be provided as answers to the submitted question. The detected answers may be provided to a user via user terminal 170. As noted above, the detected answers represent contextually and grammatically correct answers to the submitted question, and may also represent conversationally fluid responses to the submitted questions, such that the user may be presented with an answer that is responsive, accurate, and clear, and is within the context of the question as in a conversation.

Figure 6:
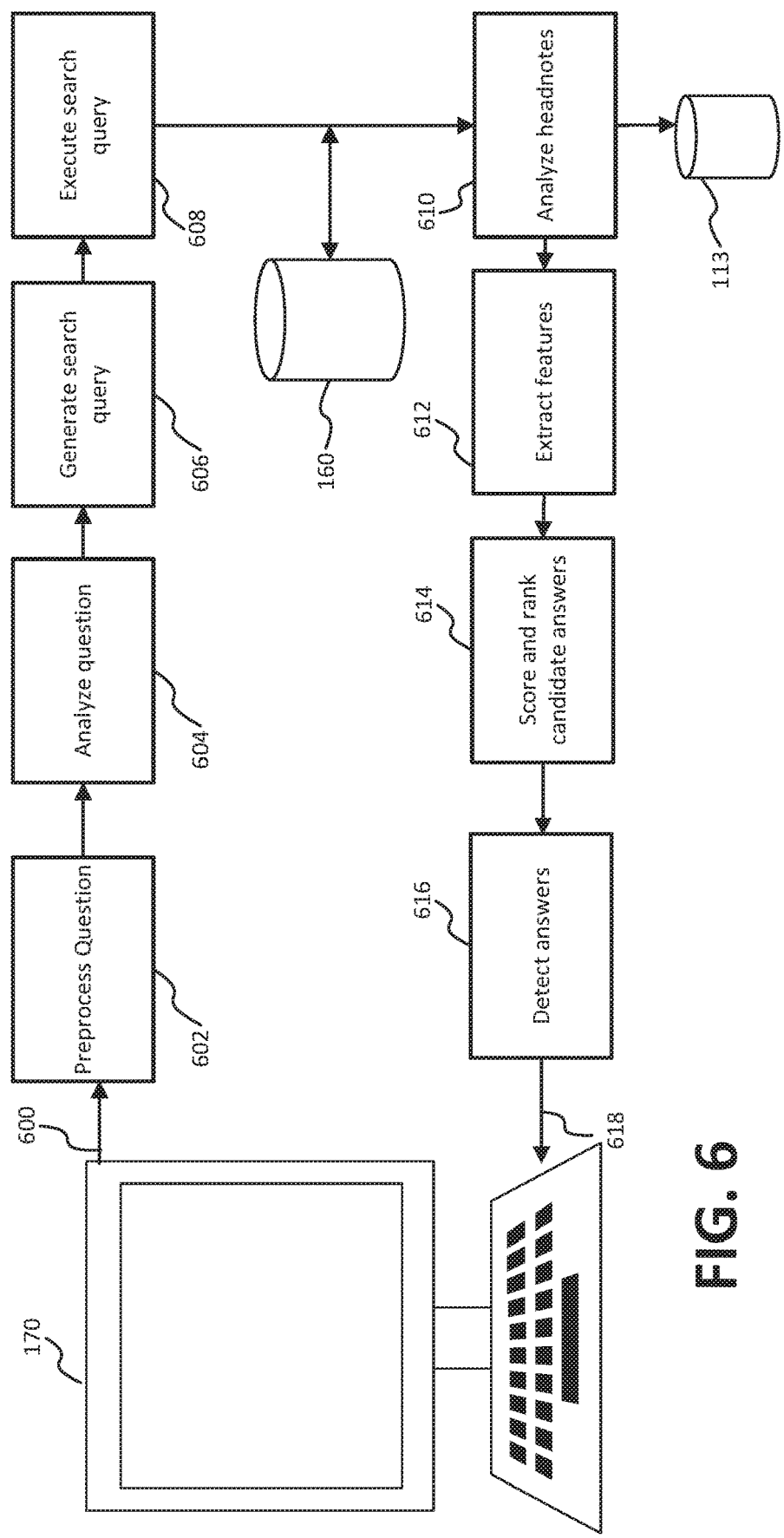
FIG. 6 shows an operational flow diagram illustrating example blocks executed to implement aspects of the present disclosure.

FIG. 6 shows a high level flow diagram of operation of a system configured in accordance with aspects of the present disclosure for generating contextually and grammatically correct answers to input questions in a conversationally fluid way, in accordance with embodiments of the present application. For example, the functions illustrated in the example blocks shown in FIG. 6 may be performed by system 100 of FIG. 1 according to embodiments herein.

In aspects, as noted above, the contextually and grammatically correct answers may be identified, obtained and/or generated from a database of pre-generated summaries, which are herein referred to as headnotes. In a particular implementation, headnotes may refer to editorially created summaries of the law addressed in court opinions. As such, a conversationally fluid, contextually and grammatically correct answer to an input question may be provided as a short passage obtained from a headnote identified in accordance with aspects of the present disclosure. In some aspects, headnotes may be restricted to a single sentence.

In general terms, in embodiments of the present disclosure, the linguistic and syntactic structure of a submitted question may be analyzed in order to determine whether the submitted question may be answered by at least one headnote. The question may then be further analyzed to determine more details about the intent and context of the question. A federated search process may then be used to identify candidate question-answer pairs from a corpus of previously, created headnotes. Machine learning models may then be used to analyze the candidate question-answer pairs based on a large number of extracted features. Additional rules may be applied to rank the candidate answers, and dynamic thresholds may be applied to identify the best potential answers to display to the user as a response to the submitted question. As such, embodiments of the present disclosure provide for natural language and rules-based processing to understand a user's question and to find a correct answer that addresses the question in a contextually, grammatically, and conversationally correct manner.

One application of the techniques and systems disclosed herein may be in legal research. As noted above, traditional Q&A systems lack functionality to provide a robust framework for answering questions in a contextually, grammatically, and conversationally correct manner at the same time. For example, in existing systems, a user may attempt to find an answer to a legal question entering keyword descriptions of the issue and running a search against case law opinions. The user may then obtain relevant results, but may be required to sort and search through the results, which may include many documents from large result lists to find the answer within one of those searched documents. Aspects of the present disclosure provide an advantageous system that allows a legal researcher to ask discrete legal questions and receive one or more answers consisting of concise passages from prior case law opinions that directly, correctly, and conversationally answer the user's question. It is again noted that the discussion that follows, which is directed to legal research reporting, is merely an example embodiment and should not be construed as limiting in any way.

At block 600, a query including at least one question is submitted by a user. In aspects, the query may be submitted via user terminal 170. At block 602, the question in the query is pre-processed. In aspects, question pre-processing may include spell checking, and auto-correction. Question pre-processing may also include determining whether the question may answered by a headnote. Determining whether the question may be answered by a headnote may include performing a fuzzy match of the question to a lookup table that defines static questions that may be excluded from further processing. In addition, a rule-based filter may also be applied to exclude questions that may not be processed by the system in some aspects, the excluded questions may include factoid-based questions that are more suited to factoid-based Q&A systems.

When it is determined that the question is a valid question within the context of the Q&A system of embodiments, at block 604, the question is analyzed. Question analysis may include natural language processing, entity recognition, frame classification, key number classification, and embeddings analysis, in accordance with the functionality discussed above with respect to question/answer processor 120. Accordingly, in embodiments, question/answer processor 120 may provide the execution environment for the question analysis at block 604. The results of the question analysis at block 604 may include identification of the question's context and/or intent. In some aspects, the question's intent may refer to a frame into which the question may be classified.

At block 606, at least one search query is generated to identify candidate answers that potentially answer the submitted question. Search query generation may be in accordance with the search query generation functionality discussed above with respect to query, generator 121. Accordingly, in embodiments, query generator 121 may provide the execution environment for the search query generation at block 606. In aspects, the search query may include a natural language search query, a semantic search query, and/or a "more-like-this" search query, as discussed above. The natural language search query may be based on the text of the question. The "more-like-this" search query may include a search query in which a candidate answer may be used as the query. As will be appreciated, a "more-like-this" search query may not be generated without a set of candidate answers. However, where a set of candidate answers is obtained (e.g., by executing another type of search) a "more-like-this" search may be used to increase the pool of potential answers after the initial set of candidate answers has been scored.

In aspects, a semantic search query may include a structured search query based on the question, entities extracted, and frame classification information obtained at block 604. As such, a semantic search may be based on frame-specific structured queries. In aspects, a semantic search query may be generated using frame-specific search templates, in accordance with the description above with respect to query generator 121. Frame-specific search templates may be associated with particular frames, and may include placeholders for specific frame elements of the associated frame. Entities extracted from the question at block 604 may be used to replace the placeholders in the frame-specific search template to produce a fully formed search query for execution against a search engine. Semantic searches increase the accuracy of the search queries by adding structure to the information request sent to the various search engines such that user intent in the question may be more precisely specified to the search engine. In embodiments, a semantic search may produce search results of candidate answers that may be more relevant to the user's question because the search results better match the underlying semantics of the question.

At block 608, the at least one search query generated at block 606 is executed. In aspects, the at least one search query may be executed against one or more search engines, such as the search engines associated with search engines module 160. The search engines associated with search engines module 160 may be search engines external to system 100, or may include data stores associated with the search engines. In aspects, the one or more search engines against which the at least one search query is executed may include different search engines that may, implement different retrieval algorithms. As such, the candidate answers (e.g., headnotes) received as a result of the search query may represent a diverse set of results for the submitted question. The results of the search query execution may include a set of headnotes representing candidate answers to the submitted question.

In an optional embodiment, at block 210, the set of candidate headnotes identified at block 608 is analyzed. Headnote analysis may include natural language processing, entity recognition, frame classification, key number classification, and embeddings analysis, in accordance with the functionality discussed above with respect to question/answer processor 120. Accordingly, in embodiments, question/answer processor 120 may provide the execution environment for the headnotes analysis. Block 210 may be optional at runtime because, as noted above, headnote analysis may have been performed offline, prior to the submission of the question, and cached in database 113. As such, instead of performing headnote analysis at block 210, the previously performed headnote analysis for the candidate headnotes may be retrieved from database 113. Caching the headnote analysis allows for performance optimization because system resources may be re-allocated to other operations instead of the linguistic and syntactic analysis of the headnotes in the set of candidate answers.

At block 612, features are extracted from the candidate question-answer pairs in order to score and rank the candidate answers. In some aspects, before features may be extracted from the candidate question-answer pairs, duplicate candidates may be eliminated. In embodiments, features extracted may include linguistic similarity features, concept coordination features, topicality features, abstract/concrete classification features, and/or key number scoring functions. At block 614, the extracted features may be fed into an ensemble classification model to score and rank the candidate question-answer pairs. In aspects, each question submitted may generate a question-answer pair for every candidate answer in the search results. For each feature of the extracted features, each question-answer pair may be scored. Each feature score of each question-answer pair may be fed into the ensemble classification model, and the ensemble classification model may generate a score that may represent the probability that the candidate answer in the candidate question-answer pair is a correct answer for the question. In aspects, each candidate question-answer pair may be analyzed independently, and the score for each of the candidate question-answer pairs may be used to rank the answers from high to low probability.

In some aspects, the ensemble classification model may represent a combination of the extracted features. In embodiments, the ensemble classification model may implement gradient boosted decision trees. Training of the ensemble classification model may be performed by optimizing a logistic loss function. In this sense, the ensemble classification model may be a supervised model that may learn by example from question-answer pairs, which may be pre-graded as correct or incorrect.

At block 616, candidate answers to be provided as answers to the submitted question are detected. Detecting the answers to the question may include performing post-ranking processing of the candidate question-answer pairs, and applying a threshold determination. In aspects, post-ranking processing may include constraint checking and score weighting, in which constraint rules are applied to the results of the candidate ranking model in order to ensure that candidate answers to a question in a particular frame contain certain elements required by that frame. Additionally, weighting rules may be used to penalize mismatches between the questions and answer frame more strictly than the model otherwise would, or to boost an answer. For example, for questions seeking a definition of a word/phrase, the rank of candidate answers having the actual word/phrase, or the word "means," might be boosted.

In aspects, a threshold determination may be applied to identify the candidate answers to be provided as answers to the submitted question. The threshold determination may determine whether or not to provide an answer as response to the question based on a confidence in correctness of the candidate score. As the ensemble classification model outputs a probability of an answer being a correct answer, a threshold may be set on the probability scores. In this case, any candidate answer meeting or exceeding the threshold may be provided as an answer to the question.

At block 618, the detected answers are provided as answers to the submitted question. The detected answers may be provided to a user via user terminal 170. As noted above, the detected answers represent contextually and grammatically correct answers to the submitted question, and may also represent conversationally fluid responses to the submitted questions, such that the user may be presented with an answer that is responsive, accurate, and clear, and is within the context of the question as in a conversation.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-3, and 6 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method comprising:
receiving a query from a user terminal, the query including a question having a linguistic and syntactic structure;
analyzing the linguistic and syntactic structure of the question to determine at least a context of the question;
pre-processing the received question prior to the analyzing, wherein the pre-processing includes determining whether the question is of a type that can be answered by a headnote,
generating at least one search query based on the analyzing the linguistic and syntactic structure of the question;
causing the at least one search query to be executed on at least one data store;
obtaining a plurality of candidate answers in response to the execution of the search query, wherein each candidate answer of the plurality of candidate answers is a headnote;
obtaining a linguistic and syntactic analysis of each candidate answer of the plurality of candidate answers, wherein the question is paired with each candidate answer of the plurality of candidate answers to form a plurality of question-answer pairs;
extracting at least one feature for each question-answer pair of the plurality of question-answer pairs;
feeding the extracted at least one feature for each question-answer pair into a ranking model;
scoring, by the ranking model, for each feature of the at least one feature, each question-answer pair, wherein a score for a particular question-answer pair resulting from the scoring represents a probability that the particular candidate answer of the particular question-answer pair is a correct answer to the question;
ranking the candidate answers of the plurality of candidate answers based on the score of each candidate answer; and
providing at least one of the ranked candidate answers as answer to the question in the query.

2. The method of claim 1, wherein the analyzing the linguistic and syntactic structure of the question includes one of: natural language processing, entity recognition, frame classification, key number classification, and embeddings analysis.

3. The method of claim 2, wherein the context of the question includes the intent of the question, and wherein the frame classification includes classifying the question into at least one frame category associated with the intent of the question.

4. The method of claim 2, wherein the at least one frame category is one of: Admissibility, Availability of Damages or Remedy, Burden of Proof, Construction of Instruments, Court Authority, Elements, Factors, and Tests, Accrual of Statute of Limitations, Tolling of Statute of Limitations, Duration of Statute of Limitations, Standard of Review, Enforceability of Contracts, and Others.

5. The method of claim 1, wherein the obtaining the linguistic and syntactic analysis of each candidate answer of the plurality of candidate answers includes analyzing the linguistic and syntactic structure of each candidate answer subsequent to the obtaining the plurality of candidate answers in response to the execution of the search query.

6. The method of claim 1, wherein the obtaining the linguistic and syntactic analysis of each candidate answer of the plurality of candidate answers includes analyzing the linguistic and syntactic structure of each candidate answer prior to the obtaining the plurality of candidate answers in response to the execution of the search query, wherein the linguistic and syntactic analysis of each candidate answer is obtained from a database.

7. The method of claim 1, further comprising post-processing the ranked candidate answers, wherein the post-processing includes one of:
applying constraint rules to the ranked candidate answers, to ensure that the candidate answers contain required elements, wherein a particular ranked candidate answer is eliminated as a candidate answer based on a constraint rule being met; and
applying weighting rules to one of penalize and boost a ranked candidate answer.

8. The method of claim 1, wherein the providing at least one of the ranked candidate answers as answer to the question in the query includes performing a threshold determination to the at least one of the ranked candidate answers to determine whether the at least one of the ranked candidate answers will be provided as an answer to the question based on a threshold.

9. The method of claim 8, wherein the threshold is a threshold value of a probability that the at least one of the ranked candidate answers is a correct answer, wherein the at least one of the ranked candidate answers is determined to be provided as an answer to the question when a probability score of the at least one of the ranked candidate answers exceeds the threshold value.

10. The method of claim 1, wherein the extracted at least one feature includes at least one of: a linguistic similarity feature, a concept coordination feature, a topicality feature, an abstract/concrete classification feature, and a key number scoring function feature.

11. The method of claim 1, wherein the search query includes one of: a natural language search query, a more-like-this search query, and a semantic search query.

12. The method of claim 11, wherein the analyzing the linguistic and syntactic structure of the question includes determining a frame into which the question is classified, wherein the semantic search query includes:
   obtaining a frame-specific search template, the frame-specific search template associated with the frame of the question, and wherein the frame-specific search template defines at least one placeholder corresponding to an element of the frame of the question;
   identifying an entity in the question corresponding to the element of the frame corresponding to the at least one placeholder; and
   replacing the placeholder in the frame-specific search template with the identified entity to generate a complete frame-specific search template, wherein the generating at least one search query is based on the complete frame-specific search template.

13. A system comprising:
   a question/answer processor configured to:
      receive a query from a user terminal, the query including a question having a linguistic and syntactic structure;
      analyze the linguistic and syntactic structure of the question to determine at least a context of the question; and
      pre-process the received question prior to analyzing the linguistic and syntactic structure of the question, wherein pre-processing includes determining whether the question is of a type that can be answered by a headnote;
   a query generator configured to:
      generate at least one search query based on the analyzing the linguistic and syntactic structure of the question;
      cause the at least one search query to be executed on at least one data store; and
      obtain a plurality of candidate answers in response to the execution of the search query, wherein each candidate answer of the plurality of candidate answers is a headnote, wherein the question/answer processor is further configured to obtain a linguistic and syntactic analysis of each candidate answer of the plurality of candidate answers, and to pair the question with each candidate answer of the plurality of candidate answers to form a plurality of question-answer pairs;
   a feature extractor configured to:
      extract at least one feature for each question-answer pair of the plurality of question-answer pairs; and
      feed the extracted at least one feature for each question-answer pair into a candidate ranker;
   the candidate ranker configured to:
      score, using a ranking model, for each feature of the at least one feature, each question-answer pair, wherein a score for a particular question-answer pair resulting from the scoring represents a probability that the particular candidate answer of the particular question-answer pair is a correct answer to the question; and
      rank the candidate answers of the plurality of candidate answers based on the score of each candidate answer; and
   an answer detector configured to provide at least one of the ranked candidate answers as answer to the question in the query.

14. The system of claim 13, wherein the configuration of the question/answer processor to analyze the linguistic and syntactic structure of the question includes configuration of the question/answer processor to perform one of: natural language processing, entity recognition, frame classification, key number classification, and embeddings analysis.

15. The system of claim 13, wherein the configuration of the question/answer processor to obtain the linguistic and syntactic analysis of each candidate answer of the plurality of candidate answers includes configuration of the question/answer processor to one of:
   analyze the linguistic and syntactic structure of each candidate answer subsequent to obtaining the plurality of candidate answers in response to the execution of the search query; and
   analyze the linguistic and syntactic structure of each candidate answer prior to obtaining the plurality of candidate answers in response to the execution of the search query, wherein the linguistic and syntactic analysis of each candidate answer is obtained from a database.

16. The system of claim 13, wherein the configuration of the answer detector to provide at least one of the ranked candidate answers as answer to the question in the query includes configuration of the answer detector to perform a threshold determination to the at least one of the ranked candidate answers to determine whether the at least one of the ranked candidate answers will be provided as an answer to the question based on a threshold, wherein the threshold is a threshold value of a probability that the at least one of the ranked candidate answers is a correct answer, wherein the at least one of the ranked candidate answers is determined to be provided as an answer to the question when a probability score of the at least one of the ranked candidate answers exceeds the threshold value.

17. The system of claim 13, wherein the search query includes one of: a natural language search query, a more-like-this search query, and a semantic search query.

18. The system of claim 17, wherein the configuration of the question/answer processor to analyze the linguistic and syntactic structure of the question includes configuration to determine a frame into which the question is classified, wherein the semantic search query includes:
   obtaining a frame-specific search template, the frame-specific search template associated with the frame of the question, and wherein the frame-specific search template defines at least one placeholder corresponding to an element of the frame of the question;
   identifying an entity in the question corresponding to the element of the frame corresponding to the at least one placeholder; and replacing the placeholder in the frame-specific search template with the identified entity to generate a complete frame-specific search template, wherein the generating at least one search query is based on the complete frame-specific search template.

19. A computer-based tool including non-transitory computer readable media having stored thereon computer code which, when executed by a processor, causes a computing device to perform operations comprising:

receiving a query from a user terminal, the query including a question having a linguistic and syntactic structure;

analyzing the linguistic and syntactic structure of the question to determine at least a context of the question;

pre-processing the received question prior to the analyzing, wherein the pre-processing includes determining whether the question is of a type that can be answered by a headnote, generating at least one search query based on the analyzing the linguistic and syntactic structure of the question;

causing the at least one search query to be executed on at least one data store;

obtaining a plurality of candidate answers in response to the execution of the search query, wherein each candidate answer of the plurality of candidate answers is a headnote;

obtaining a linguistic and syntactic analysis of each candidate answer of the plurality of candidate answers, wherein the question is paired with each candidate answer of the plurality of candidate answers to form a plurality of question-answer pairs;

extracting at least one feature for each question-answer pair of the plurality of question-answer pairs;

feeding the extracted at least one feature for each question-answer pair into a ranking model;

scoring, by the ranking model, for each feature of the at least one feature, each question-answer pair, wherein a score for a particular question-answer pair resulting from the scoring represents a probability that the particular candidate answer of the particular question-answer pair is a correct answer to the question;

ranking the candidate answers of the plurality of candidate answers based on the score of each candidate answer; and providing at least one of the ranked candidate answers as answer to the question in the query.

* * * * *